Patented Feb. 4, 1941

2,230,903

UNITED STATES PATENT OFFICE 2,230,903

ODOR ABSORBING COMPOSITION

Zeno Ostenberg, Milpitas, Calif.

No Drawing. Application November 18, 1939,
Serial No. 305,187

2 Claims. (Cl. 128—156)

This invention relates to improvements in odor absorbing compositions, and more particularly to a novel composition capable of absorbing liquid, gaseous and certain solid aqueous secretions and excretions of the body which carry undesirable and offensive odors.

Heretofore, the various kinds of bandages, pads and dressings carrying odor absorbents have become ineffective and useless in a short time because of their inability to absorb the large amount of liquid accompanying the secretions or excretions. Those odor absorbing compositions depending upon the oxidization of substances causing the odors are apt to be irritating to the tissues with which they come in contact, and for this reason are not suitable for use in bandages or pads.

The odor absorbing composition comprising the present invention has no irritating effects upon the tissues with which it comes in contact, is neutral, and is capable of absorbing relatively large amounts of liquid without itself becoming fluid. It holds the liquid secretion or excretion as well as the accompanying odors by colloidal adsorption and capillary absorption. After use it may be readily disintegrated and disposed of by submerging in an excess of water such as is ordinarily available in sanitary drainage systems, or it may be readily burned in an incinerator in the usual manner.

It has long been known that silica gel will absorb considerable liquid and some gases, but its value as an absorbent and adsorbent of odors coming from compounds which are normally liquid or solid at ordinary temperatures has never been fully investigated. Silica gel now commercially obtainable in massive, granular or powdered form is commonly employed as an absorbent and adsorbent, but in such form is incapable of absorbing secretions and excretions of the body and accompanying odors principally because the surface of each block, grain or particle is quickly occluded by the protein content and detritus present in the secretion or excretion, and thus the bulk of the silica gel is rendered useless and unavailable for the purposes intended.

The product of the present invention is a loose mass of substantially separated cellulosic fibers, with the separate fibers each having a coating of dehydrated silica gel. The cellulosic fibers maintain the silica gel in a highly dispersed state with an extremely large exposed surface for a given amount of silica gel. The cellulosic fibers further form a multiplicity of wicks for carrying the secretions to every part of the increased surface of the gel. The fibers are in substantially nonadherent relationship with each other so as to form a loosely coherent mass and the product of the present invention is not to be confused with felted materials such as blotting paper which have been impregnated with silica gel and in which the silica gel substantially fills the voids between the fibers or acts as a binder for the fibers. The voids between the individual coated fibers of the present invention substantially increase the absorptiveness of the product.

The present invention overcomes the inherent defects in bulk or commercial silica gel; first, by supplying suitable means for maintaining the silica gel in a highly dispersed condition with a greatly increased surface exposed for contacting with the secretions and excretions of the body; secondly, by supplying wicks or channels to carry the secretions and excretions to every part of this increased surface; and thirdly, by supplying a supporting medium so that it can absorb and adsorb a larger amount of liquid secretion and excretion without becoming softened, mushy or pulpy to the extent of interfering with its normal function.

The silica gel can be precipitated upon the fibers in any desired manner and the ratio of silica gel to cellulosic fibers may vary within wide limits, depending upon the absorptiveness necessary for a particular use. As an example of preparing an odor absorbing composition in accordance with my invention, I take an aqueous suspension of cellulosic fibers and add an aqueous solution of a soluble silicate in such amounts that the silica content is approximately equal to the weight of the cellulose. While the solution of cellulosic fibers and silicate is being constantly agitated, a suitable acid such as hydrochloric acid is added to cause the silica to precipitate and acquire a gelatinous form. The water and dissolved salts are then removed by any well known method such as by filtration, pressing or centrifugal wringing, and by repeated washing all separable salts, acids and other soluble substances which might irritate the body tissues are removed, thereby causing the residual mass to be left in a substantially neutral condition. The semi-dry mass is next sufficiently broken up to substantially separate the cellulosic fibers, after which it is carefully dried while maintained at a temperature sufficiently low as to not cause an alteration of the cellulosic material but at the same time high enough to dry out the silica gel and cause it to shrink and adhere to the interspersed cellulosic fibers which form a support for said gel. To inhibit the decomposition of the cellulosic material, it has been found that the temperature at which the semi-dry mass may be maintained during the drying operation should be somewhat less than 150 centigrade. The drying operation may be satisfactorily carried out under varying temperatures, depending principally upon such conditions as the length of time the mass of material is to be maintained in a heated condition and the moisture content of the surrounding air. In this connection it has been found that a temperature of between 100° and 110° centigrade is most desirable for drying gels containing a minimum amount of silica, and that a temperature of slightly less than 130° centigrade is suitable for drying gels containing a maximum amount of silica. It has also been demonstrated that the drying operation may be carried out with a temperature of as low as 20° centigrade when a current of dry air is employed. Sodium silicate is preferably employed to form the silica gel, although any of the soluble silicates such as the alkali metal silicates are contemplated.

It is to be understood that the proportions of cellulosic fiber and soluble silicate used in making my odor absorbing compound may be varied considerably, as for example, for thick mucilaginous secretions or excretions less silicate and more cellulosic fiber proves advantageous, and for very thin, watery secretions and excretions which are frequently highly odoriferous, more silicate and less cellulosic fiber is desirable.

This application is a continuation in part of my copending application Serial No. 67,416, filed October 5, 1937.

Having described my invention what I claim is:

1. An odor absorbing composition comprising a mass of cellulosic fibers individually coated with dehydrated silica gel, said coated fibers being substantially separated and forming a loosely coherent absorptive mass.

2. The process of manufacturing odor absorbing compositions, which comprises, forming an aqueous suspension of cellulosic fibers in an aqueous solution of a soluble silicate, precipitating said silicate to cause the formation of silica gel, removing excess water from the resulting mass of fibers and silica gel, substantially separating the coated fibers, and drying the same to produce a loosely coherent absorptive mass of cellulosic fibers individually coated with dehydrated silica gel.

ZENO OSTENBERG.